(12) United States Patent
van Roosmalen et al.

(10) Patent No.: US 10,367,414 B2
(45) Date of Patent: Jul. 30, 2019

(54) SWITCH-MODE POWER SUPPLY

(71) Applicant: NXP B.V., Eindhoven (NL)

(72) Inventors: Marcel Wilhelm Rudolf Martin van Roosmalen, Wijchen (NL); Petrus Cornelis Theodorus Laro, Wijchen (NL); Humphrey de Groot, Vlijmen (NL); Bobby Jacob Daniel, Eindhoven (NL); Arjan van den Berg, Helmond (NL); Dirk Wouter Johannes Groeneveld, Elst (NL)

(73) Assignee: NXP B.V., Eindhoven (NL)

( * ) Notice: Subject to any disclaimer, the term of this patent is extended or adjusted under 35 U.S.C. 154(b) by 239 days.

(21) Appl. No.: 15/484,976

(22) Filed: Apr. 11, 2017

(65) Prior Publication Data
US 2017/0302164 A1 Oct. 19, 2017

(30) Foreign Application Priority Data

Apr. 15, 2016 (EP) .................................. 16165690

(51) Int. Cl.
*H02J 7/00* (2006.01)
*H02M 1/12* (2006.01)
(Continued)

(52) U.S. Cl.
CPC ............. *H02M 1/44* (2013.01); *H02J 7/0052* (2013.01); *H02M 1/126* (2013.01);
(Continued)

(58) Field of Classification Search
CPC .. H02J 2007/0059; H02J 7/0052; H02M 1/44; H02M 3/33507
See application file for complete search history.

(56) References Cited

U.S. PATENT DOCUMENTS 5,650,694 A * 7/1997 Jayaraman ......... H05B 41/2828
307/157
5,872,429 A * 2/1999 Xia .................... H05B 37/0263
315/194
(Continued)

FOREIGN PATENT DOCUMENTS

JP 59129571 A 7/1984
WO WO-03098788 A1 * 11/2003 ............ H02M 1/126
(Continued)

OTHER PUBLICATIONS

Yang, Yuchen et al; "Transformer Shielding Technique for Common Mode Noise Reduction in Isolated Converters" IEEE Energy Conversion Congress and Exposition; pp. 4149-4153 (2013).

*Primary Examiner* — Lewis G West

(57) ABSTRACT

A switch mode power supply is described including a primary side for coupling to a mains supply and a secondary side for coupling to a device, an isolation transformer comprising a primary coil and a secondary coil and arranged to isolate the primary side from the secondary side, and a noise filter coupled between a primary ground at the primary side and a secondary ground at the secondary side, the noise filter having a conductance value that varies with frequency. The noise filter conductance comprises a peak conductance in a peak conductance frequency region. The noise filter is operable to reduce the common-mode noise of the switch mode power supply at frequencies occurring in the peak conductance frequency region.

15 Claims, 14 Drawing Sheets

(51) Int. Cl.
 *H02M 1/44* (2007.01)
 *H02M 3/335* (2006.01)
(52) U.S. Cl.
 CPC . *H02M 3/33507* (2013.01); *H02J 2007/0059* (2013.01); *H02M 2001/123* (2013.01)

(56) References Cited

U.S. PATENT DOCUMENTS

| | | | |
|---|---|---|---|
| 6,249,876 B1* | 6/2001 | Balakrishnan | H02M 1/12 |
| 6,490,181 B1 | 12/2002 | Liu et al. | |
| 2004/0032753 A1* | 2/2004 | Liu | B29C 45/76 |
| | | | 363/39 |
| 2009/0212754 A1* | 8/2009 | Ryan | H02M 1/14 |
| | | | 323/282 |
| 2011/0221391 A1* | 9/2011 | Won | H01M 10/44 |
| | | | 320/108 |
| 2014/0268900 A1* | 9/2014 | Hu | H02M 3/158 |
| | | | 363/18 |
| 2015/0022174 A1* | 1/2015 | Nikitin | H02M 3/156 |
| | | | 323/282 |
| 2016/0334455 A1* | 11/2016 | Ishida | G01R 31/045 |
| 2017/0244318 A1* | 8/2017 | Giuliano | H02M 3/07 |
| 2017/0288554 A1* | 10/2017 | Fahlenkamp | H02M 1/08 |

FOREIGN PATENT DOCUMENTS

| | | | |
|---|---|---|---|
| WO | WO-2012/028787 A2 | 3/2012 | |
| WO | WO-2012028787 A2 * | 3/2012 | H02M 1/44 |

* cited by examiner

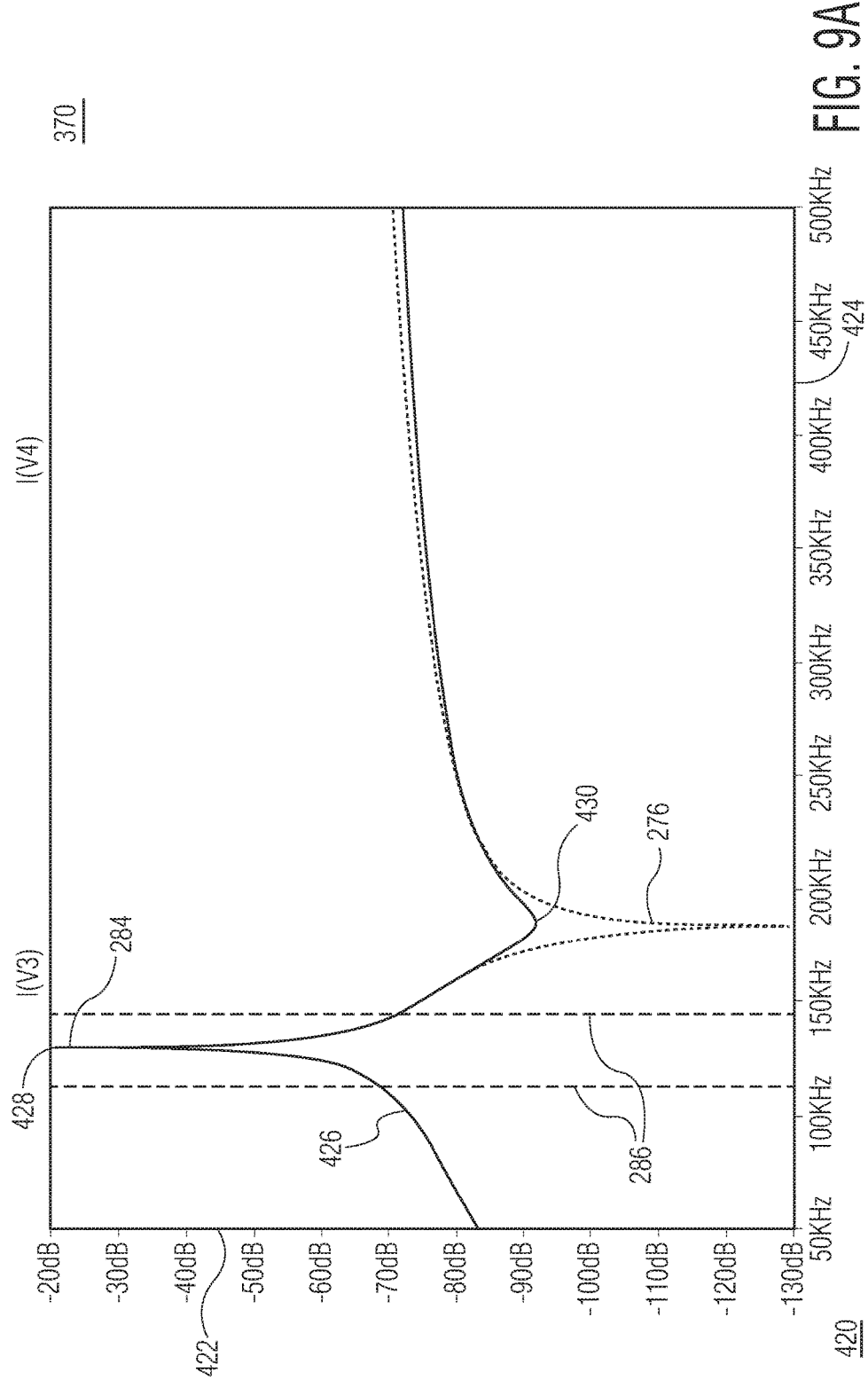

SWITCH-MODE POWER SUPPLY

CROSS-REFRENCCE TO RELATED APPLICATIONS

This application claims the priority under 35 U.S.C § of European patent application no. 16165690.5, filed Apr. 15, 2016 the contents of which are incorporated by reference herein.

FIELD

This disclosure relates to switch-mode power supplies.

BACKGROUND

Electromagnetic compatibility can be an important issue in electronic devices, for example to comply with international standards to minimize Electromagnetic Interference (EMI). Switch-mode power supplies may be designed to conform to these standards to reduce the transient noise on the power line. In a power supply with two power lines and a protective earth, the transient noise may include differential noise and common mode noise. Common mode noise may be expressed as a potential difference with respect to a protective earth (PE). The differential mode noise may be seen as an injected potential difference between the live and neutral mains supply.

SUMMARY

Various aspects of the disclosure are defined in the accompanying claims. In a first aspect there is defined a switch mode power supply comprising a primary side for coupling to a mains supply and a secondary side for coupling to a device, an isolation transformer comprising a primary coil and a secondary coil and arranged to isolate the primary side from the secondary side, and a noise filter coupled between a primary ground at the primary side and a secondary ground at the secondary side, the noise filter having a conductance value that varies with frequency; wherein the noise filter conductance comprises a peak conductance in a peak conductance frequency region, and wherein the noise filter is operable to reduce the common-mode noise of the switch mode power supply at frequencies occurring in the peak conductance frequency region.

In one or more embodiments of the switch mode power supply, the noise filter may comprise a capacitor and an inductor.

In one or more embodiments of the switch mode power supply, the noise filter may comprise a second capacitor in parallel with a series arrangement of the inductor and the capacitor.

In one or more embodiments of the switch mode power supply, the capacitance of the capacitor and the further capacitor may be equal. In one or more embodiments of the switch mode power supply, the noise filter may further comprise a resistance in series with the inductor and the capacitor. In some embodiments the resistance may have a value in the range of 50 Ohms to 5 KOhms.

In one or more embodiments of the switch mode power supply, the noise filter may further comprise a further inductor in series with the second capacitor.

In one or more embodiments of the switch mode power supply, the noise filter may further comprise a further inductor arranged in series with the capacitor and in parallel with a third capacitor.

In one or more embodiments of the switch mode power supply, each of the capacitor and the second capacitor in the noise filter may comprise Y-capacitors.

In one or more embodiments of the switch mode power supply, each of the capacitor and the further capacitor may have a capacitance below a predetermined maximum value.

In one or more embodiments of the switch mode power supply, the capacitor may have a value in the range of 50 picoFarads (pF) to 220 pF, the second capacitor may have a value in the range of 50 pF to 220 pF and the inductor may have a value in the range of 1 millihenry (mH) to 30 mH.

In one or more embodiments of the switch mode power supply, the noise filter comprises a first terminal connected directly to the primary ground and a second terminal connected directly to the secondary ground.

In one or more embodiments of the switch mode power supply, the peak conductance frequency region has a centre frequency in the range of 80 to 150 KHz and a bandwidth of 30 KHz.

In one or more embodiments of the switch mode power supply, the peak conductance frequency region may comprise a frequency equal to the frequency of operation of a touch screen controller in a mobile device.

In one or more embodiments of the switch mode power supply, the noise filter is operable to reduce common-mode noise due to the switch mode power supply over a frequency range of 60 KHz to 30 MHz and wherein the peak conductance frequency region comprises a subset of the frequency range.

In one or more embodiments of the switch mode power supply, the peak conductance occurs at a frequency of less than 150 KHz.

In one or more embodiments of the switch mode power supply, the noise filter conductance may comprise a further peak conductance in a further peak conductance frequency region. The noise filter is operable to reduce the common-mode noise of the switch mode power supply at frequencies occurring in the peak conductance frequency region and the peak conductance frequency region. The further peak conductance may occur at a frequency greater than 150 KHz. The further peak conductance frequency region may have a bandwidth of 30 KHz.

In one or more embodiments of the switch mode power supply the primary side further comprises a noise reduction capacitor coupled between a first mains input terminal and a second mains input terminal, a first inductor arranged between the first mains input and a first bridge rectifier input, and a second inductor arranged between the second mains input and a second bridge rectifier input. The first inductor and the second inductor are mutually coupled.

In one or more embodiments the switch mode power supply may be configured as a fly-back converter.

Embodiments of the switch mode power supply may be included in charger for a mobile device such as a mobile phone. The mobile device may include a touchscreen.

BRIEF DESCRIPTION OF DRAWINGS

In the figures and description like reference numerals refer to like features. Embodiments are now described in detail, by way of example only, illustrated by the accompanying drawings in which:

FIG. 4b shows the equivalent circuits used in the simulation of FIG. 4a.

FIG. 9a shows the simulation results of the noise filter included in the switch mode power supply of FIG. 8 and FIG. 3.

DESCRIPTION

Figure 1:
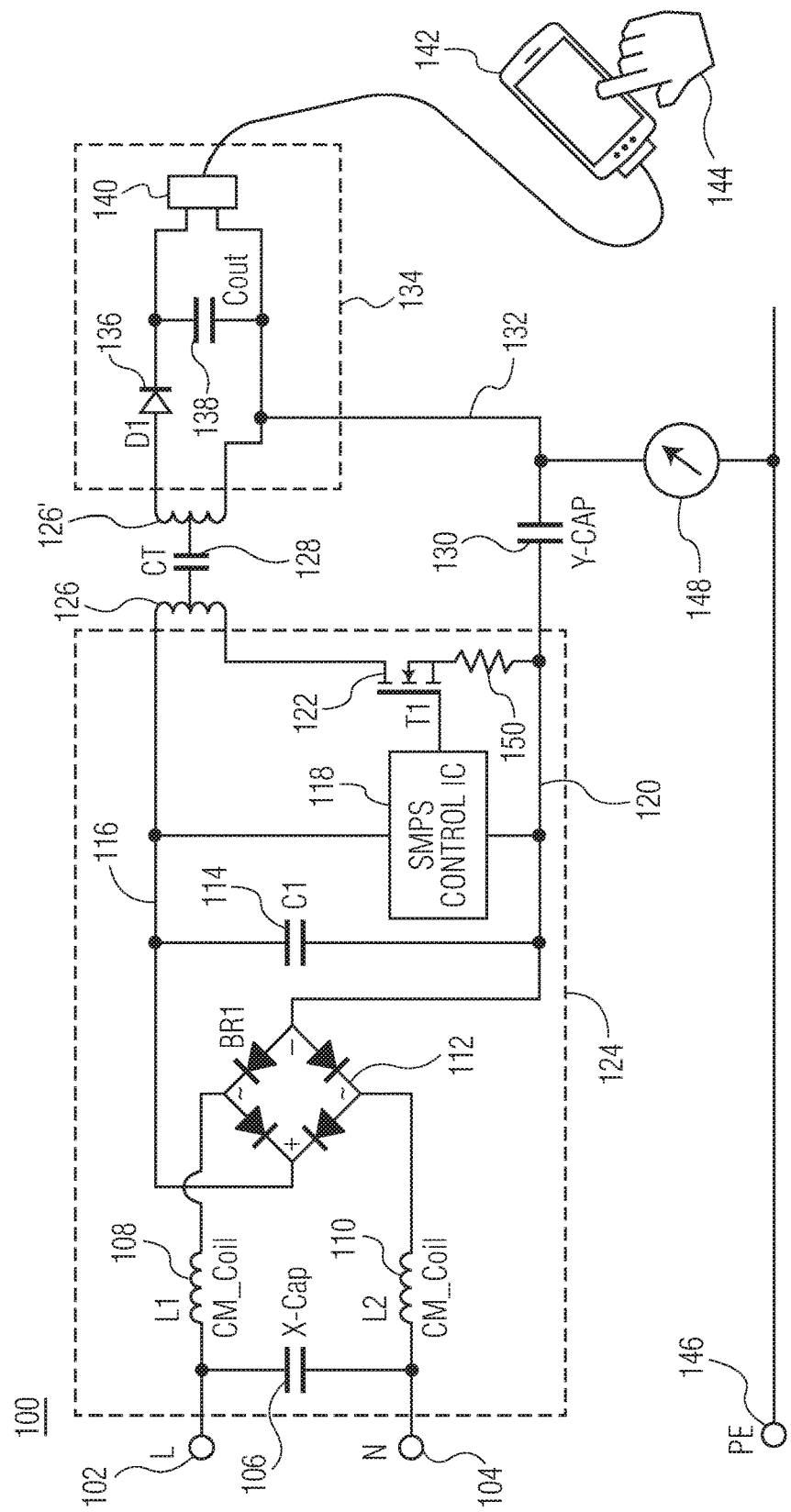
FIG. 1 shows a typical fly-back converter used to charge a mobile phone.

An example of a switch mode power supply is a fly-back converter. FIG. 1 shows a typical example of a fly-back converter 100 which may be an AC-DC converter used to charge a mobile device such as a mobile phone 142. A live terminal 102 and a neutral terminal 104 for connecting to a mains supply may be connected to a respective terminal of a bridge rectifier 112 via common mode coils or inductors 108, 110 which are mutually coupled such that any differential current flowing in opposite directions in the inductors 108, 110 is effectively ignored and only the common mode current sees the impedance of the inductors 108,110. A capacitor 106 which is typically an X-capacitor is connected between the live terminal 102 and neutral terminal 104. A first rectified output 116 is connected to a first terminal of the primary coil 126 of an isolation or isolating transformer. A second rectified output 120 may be connected to the source of an NFET transistor 122 via a sense resistor 148. The NFET transistor 122 may also be referred to as a switch transistor. In other examples, different MOSFET or other transistor types for example bipolar transistors may be used. The drain of the NFET transistor 122 is connected to a second terminal of the primary coil 126 of an isolating transformer. A capacitor 114 may be connected between the first rectified output 116 and the second rectified output 120. The second rectified output 120 may be considered as the primary ground. A switch mode power supply controller 118 may be connected to the first rectified output 116, the primary ground 120 and have a control output connected to the gate of the transistor 122. The fly-back controller 118 may be implemented as a single integrated circuit, for example the NXP TEA1836.

The components connected between the mains terminals 102, 104 and the primary coil 126 of the isolating transformer may be considered to be on the primary side 124 of the fly-back converter 100. In some example flyback converters, the common mode inductors 108,110 may be connected between the rectified outputs 116, 120 of the bridge rectifier and further circuitry instead of or as well as between the mains terminals 102,104 and the bridge rectifier.

A diode 136 may be connected between a first terminal of the secondary coil 126' of the isolating transformer and a first terminal of an output connector 140. A second terminal of the secondary coil 126' may be connected to the secondary ground 132. An output capacitor 138 is connected between the first terminal of the output connector 140 and the secondary ground 132. The secondary ground 132 may be connected to a second terminal of an output connector 140. The components connected between the secondary coil 126' of the isolating transformer and the output connector 140 may be considered to be on the secondary side 134 of the fly-back converter 100.

A capacitor 130 which is typically a Y-capacitor is connected between the primary ground 120 and the secondary ground 132.

In operation of the flyback converter 100, the NFET 122 is driven by the control IC 118. Packets of energy are transferred from the primary (left) side 124 to the secondary (right) side 130. The packets are created by switching on the NFET 122 for a certain time, building up energy in the isolating transformer 126,126'. Once the NFET 122 is switched off, the energy transfers to the output, charging the output capacitor 138. A control loop is present (not shown) which controls the output voltage by managing the amount and size of energy packets being transferred. The X-capacitor 106 in combination with the coupled common mode noise coils 108,110 may prevent the switching noise of the fly-back converter 100 polluting the mains supply connected to the live terminal 102 and the neutral terminal 104. The Y capacitor 130 may create a local loop for crosstalk currents, which occur due to the capacitances between transformer windings, shown as capacitance 128. In this way most of the noisy current will not flow outside the fly-back converter 100. The value of the Y capacitor may be limited by legislation, as it provides a higher-frequency path from the mains or primary side 124 to the secondary side 134. Consequently the capacitance value of the Y-capacitor 130 will determine the amount of higher-frequency current which can flow through a human body and so it may be important to limit the capacitance value and hence the electrical conductance of the Y-capacitor. The amount of common mode noise remaining may be determined for example by connecting a meter 148 between the protective earth 146 and the secondary ground 132.

The amount of isolation required may be specified in various frequency ranges between 150 KHz to 30 MHz, and is typically greater in the higher frequency ranges corresponding to a lower acceptable noise level and hence a higher required attenuation. For example the European CENLEC standard EN 55022 specifies limits for conducted disturbance at the mains ports of class B Information Technology Equipment (primarily for use in a domestic environment). These example limits are shown in table 1

TABLE 1

| Frequency Range | Limits dB(μV) | |
|---|---|---|
| (MHz) | Quasi-peak | Average |
| 0.15 to 0.5 | 66 to 56 | 56 to 46 |
| 0.5 to 5 | 56 | 46 |
| 5 to 30 | 60 | 50 |

During charging of a mobile phone 142 connected to the fly-back converter. A user 144 may operate a touch screen of the mobile phone. Touchscreens in mobile devices are very sensitive devices as they have to detect the presence of the user's fingertip at a well-defined position.

Typically, the touchscreen controller in a mobile device detects the user's fingertip by sensing change in capacitance. To sense capacitance, the touchscreen controller measures current in a certain frequency band, for example a 20 kHz wide band lying somewhere in the 70 kHz-500 kHz range.

When flyback converter 100 is connected to a mobile device 142 and a user 144 operates its touchscreen, since the user is coupled to the protective earth 146 any switching noise present, in the same mentioned frequency band as the touch screen controller, is now placed over the touchscreen. In the case where the charger's ground noise versus the user's potential is too high, the touchscreen may malfunction, resulting in incorrect behaviour of the mobile device.

To ensure correct behaviour of the mobile device while charging, switching schemes of the flyback converter may be applied which try to ensure that all harmonics of the switching frequency are not in the frequency band in which the touchscreen controller operates.

These schemes are known as CCM (continuous conduction mode), DCM (discontinuous conduction mode) or PWM (pulse width modulation). They all have in common that at higher output power, the switching frequency is well defined. However this is at the cost of conversion efficiency:

In CCM converters, it may be difficult to apply a synchronous rectifier (SR) as a replacement of the diode at the secondary side due to the strict timing constraints. Especially at low output voltage which may be 5V or lower, as is often the case in chargers, this means a serious power loss since a 0.6V diode voltage drop is large compared to a 5 Volt supply.

In DCM converters, a synchronous rectifier may be used as the isolating transformer current reaches zero after each current pulse, and some waiting time is present before the next pulse starts, as determined by the fixed switching frequency. As a result, some dead time is present which is not used for conversion, so by nature this is not optimal for efficiency.

For best efficiency, a quasi-resonant (QR) switching scheme also known as boundary conduction mode (BCM) may be used, as between current pulses there is no waiting time and pulses reach zero to enable SR operation. However, a drawback is that the switching frequency is not fixed, so it may enter the frequency band of operation of the touch screen controller.

Furthermore, for all conversion methods, at lower output power the switching frequency cannot be kept constant, but has to be reduced. This results in moving frequency components which may sooner or later may enter the touch screen controller's frequency band, although at a lower amplitude.

For many types of conversion methods, reliable touch screen controller operation may be affected by noise, especially for more power-efficient conversion schemes.

Figure 2:
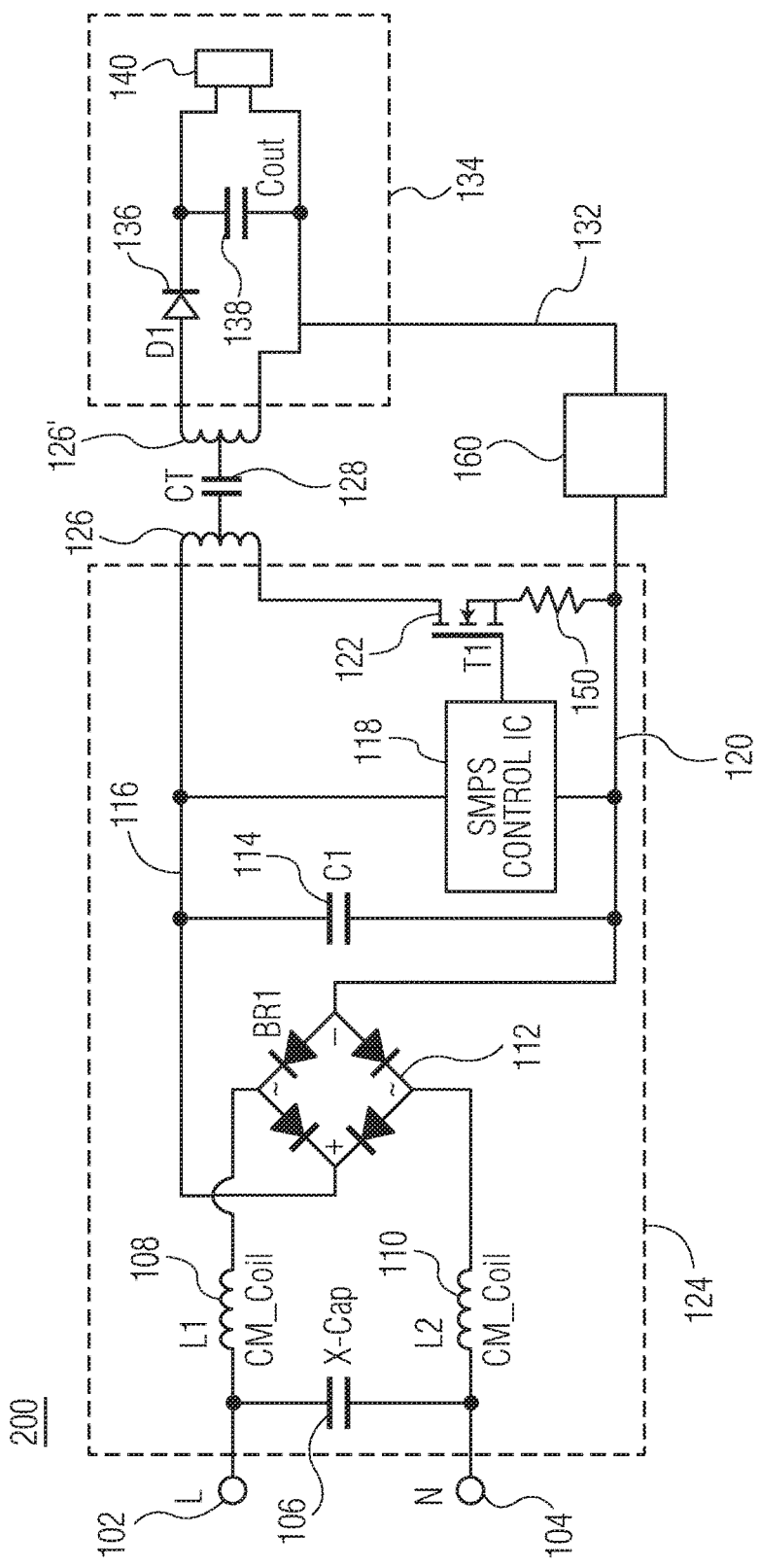
FIG. 2 illustrates a fly-back converter including a noise filter according to an embodiment.

FIG. 2 shows a fly-back converter 200 according to an embodiment. Fly-back converter 200 includes a noise filter 160 arranged between the primary ground 120 and the secondary ground 132. The noise filter 160 may have a first terminal connected to the primary ground 120 and a second terminal connected to the secondary ground 132. The noise filter 160 has a peak electrical conductance value within the frequency range of operation of the touch screen controller. The noise filter 160 may have a lower conductance value outside the frequency range. By increasing the conductance in a limited frequency range or region for example 30 KHz or less, the fly-back converter 200 may improve the suppression of common-mode noise at frequencies that may interfere with the operation of a mobile device with a touchscreen while charging. The suppression of common-mode noise at these frequencies may be greater than other frequencies. The noise filter 160 may be considered to act as a positive notch filter which increases the conductance over a limited frequency range rather than reduces it as is the case for a conventional notch filter. A conventional Y-capacitor may meet Electromagnetic Interference (EMI) requirements over a wide frequency range for example 150 KHz to 30 MHz. The noise filter 160 may, in addition to meeting the EMI requirements, boost the conductance value in a limited frequency range which may include frequencies below the normal EMI minimum frequency of 150 KHz. By boosting the conductance value in a limited frequency range which may be referred to as a peak conductance frequency region, the common-mode noise performance in that range may allow a mobile device including a touch screen to be operated correctly while charging. This may allow for a more efficient power conversion method to be used. The noise filter 150 may also be applied to other switch mode power supplies which include an isolating transformer, such as resonant converters.

Figure 3:
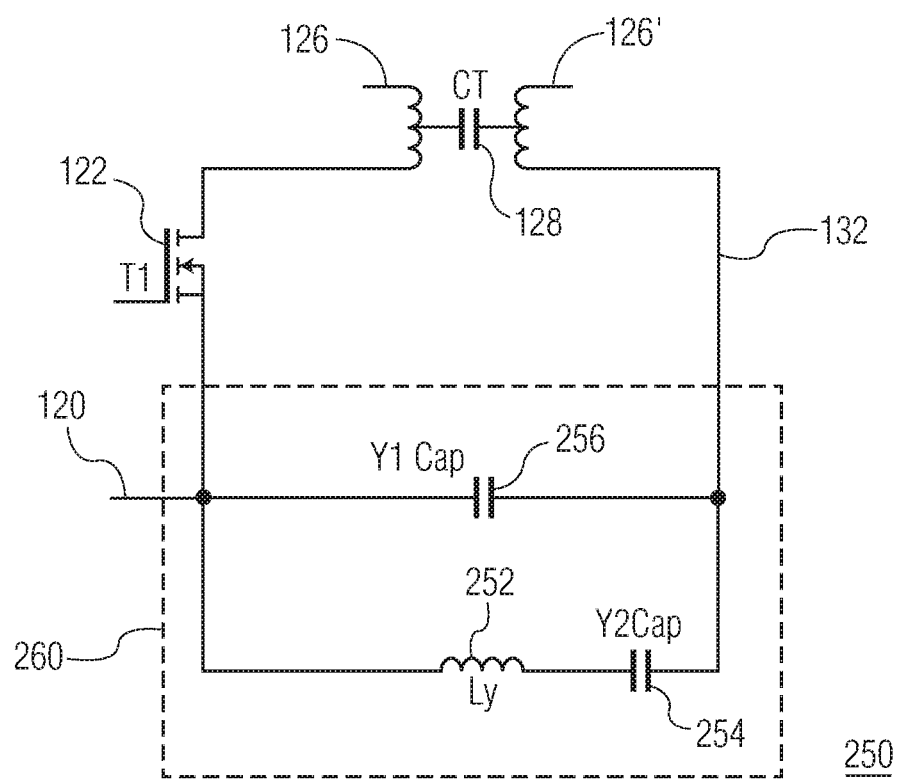
FIG. 3 shows a switch mode power supply including a noise filter according to an embodiment.

FIG. 3 shows a switch mode power supply 250 including an isolating transformer with a primary coil 126 and secondary coil 126'. A switch transistor 122 may be connected between the primary coil 126, and the primary ground 120. A noise filter 260 may be connected between a primary ground 120 and the secondary ground 132. The noise filter 260 includes a first capacitor 256 which may be a Y-type capacitor connected between the primary ground 120 and the secondary ground 132. The noise filter 260 includes a series arrangement of an inductor 252 and a second capacitor 254 which may be a Y-type capacitor connected between the primary ground 120 and the secondary ground 132. As will be appreciated, the series arrangement of an inductor 252 and a second capacitor 254 is connected in parallel with the first capacitor 256. Other components of the switch mode power supply 250 are not shown. The noise filter 260 may be considered to act as a positive notch filter which increases the conductance to a peak value over a limited frequency range or region rather than reducing the conductance as is the case for a conventional notch filter. The centre frequency of the positive notch corresponding to the peak value 282 may be determined by $$\frac{1}{2\pi\sqrt{LC_2}}$$

where L is the inductance of inductor 252 and C2 is the capacitance of second capacitor 252. The limited frequency range or region including a peak may be referred to as a peak conductance frequency region. The first capacitor 256 may have a capacitance value in the range of 50 pF to 220 pF. The second capacitor 254 may have a capacitance value in the range of 50 pF to 220 pF. In some examples, the first capacitor 256 and the second capacitor 254 may have an equal capacitance. The inductor 252 may have an inductance in the range of 1 mH to 30 mH.

Figure 4A:
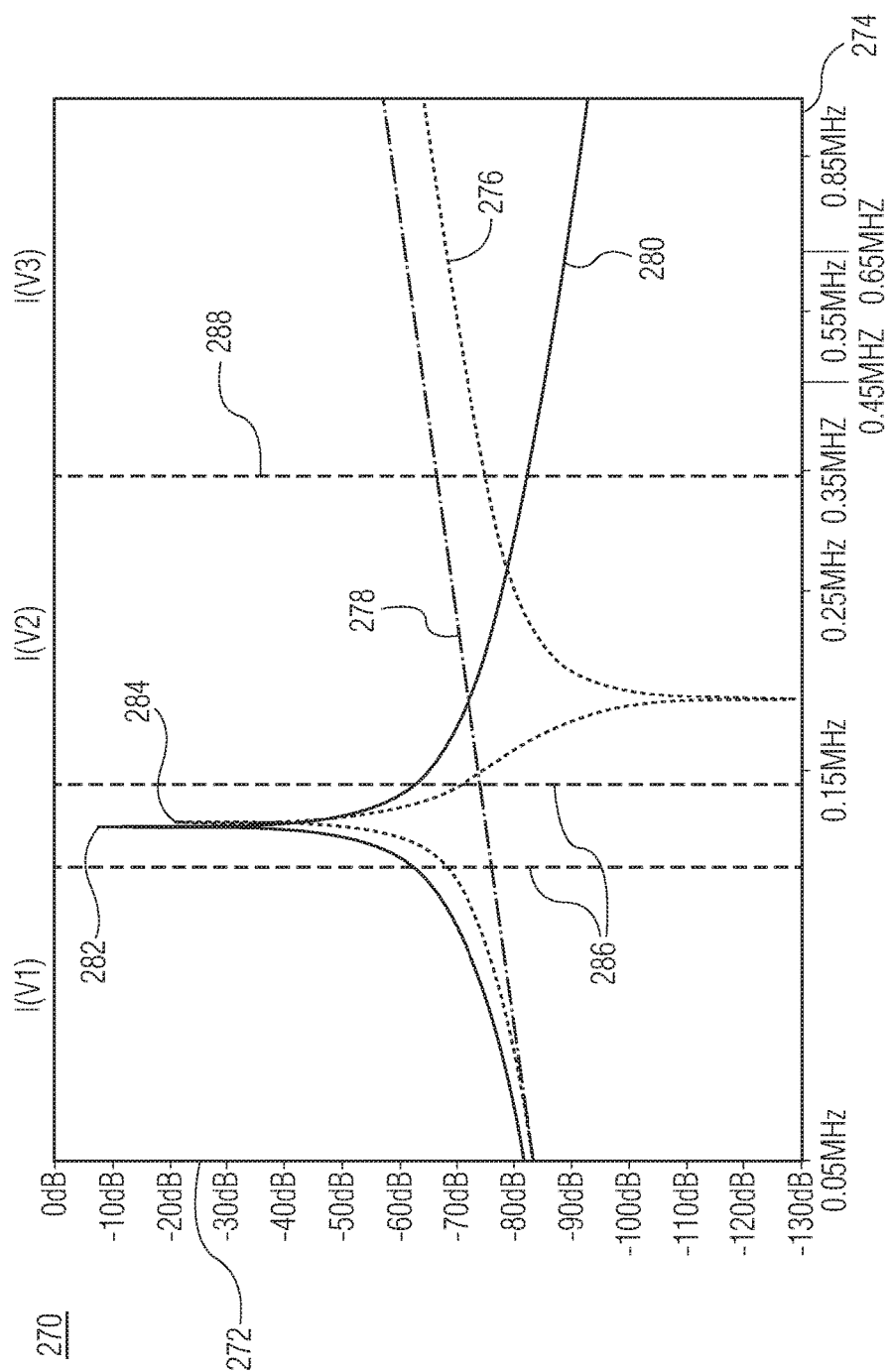
FIG. 4a shows the simulation results of the noise filter included in the switch mode power supply of FIG. 3, together with a LC circuit and a Y-capacitor.
Figure 4B:
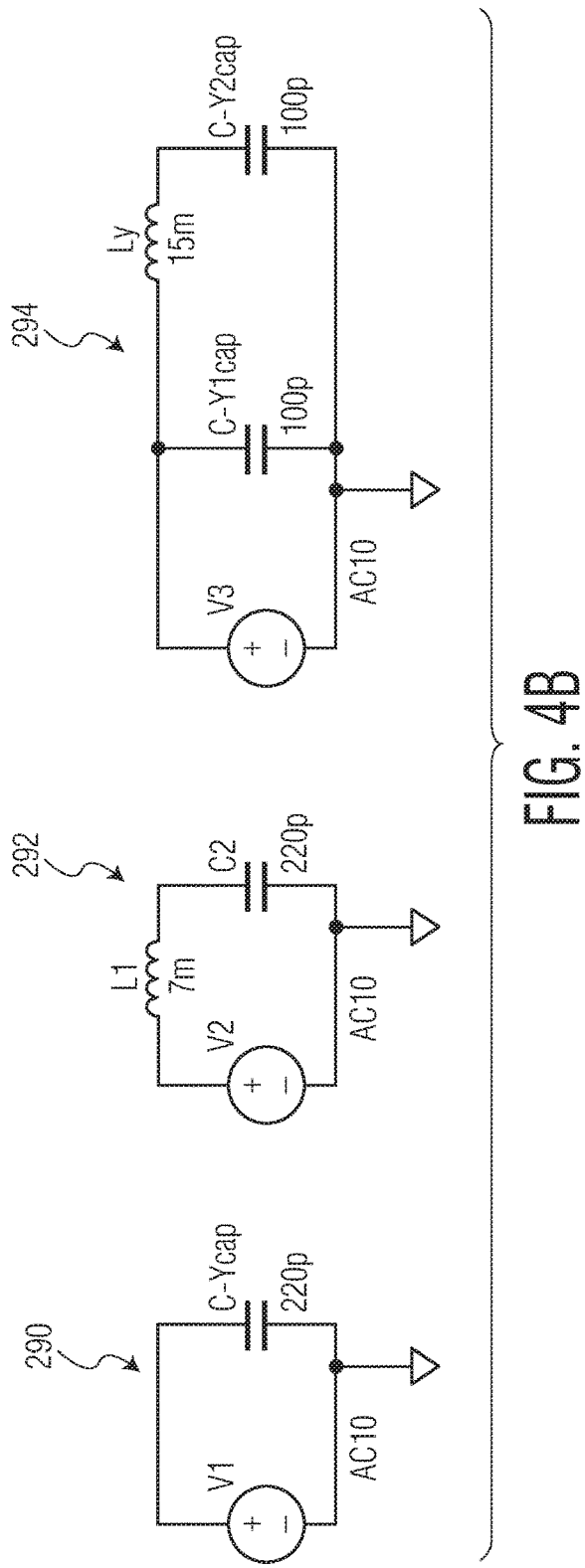

FIG. 4a shows the simulation result 270 of the noise filter 260, a conventional Y capacitor, and a further filter consisting of a series LC circuit. X-axis 274 shows frequency varying from 50 kHz to 850 kHz in a logarithmic scale. The y-axis 272 shows the filter gain values varying from −130 dB up to 0 dB which as will be understood corresponds to increasing conductance of the filter. Line 278 shows the gain of the single Y capacitor having a value of 220 pF as shown in the equivalent circuit 290 in FIG. 4b. The gain may vary between approximately −80 dB and −70 dB over the frequency range shown. Line 280 shows the response of the LC circuit 292 shown in FIG. 4b. The inductor has a value of 7 mH, and the capacitor has a value of 220 pF. The response of the LC circuit 290 shows a peak 282 at a value of approximately −5 dB within the peak conductance frequency region 286 of 30 kHz centred at around 120 kHz. However after the peak, the gain reduces with increasing frequency whereas the Y capacitor gain increases with increasing frequency. For example at 350 kHz indicated by dashed line 288 the gain is approximately −82 dB compared to approximately −65 dB for the Y capacitor. Line 276 shows the gain of the noise filter 260 simulated using the equivalent circuit 294 shown in FIG. 4B. In this example the inductor 252 may have a value of 15 mH, the first capacitor 256 may have a value of 100 pF, and the second capacitor 254 may have a value of 100 pF. The total value of the capacitance in the noise filter 260 is therefore slightly less than for the single Y capacitor circuit 292. Line 276 shows a peak 284 of approximately −20 dB at a frequency of 130 KHz. Outside the peak conductance frequency region 286, the gain of the filter 260 in this example may have a negative notch at around 210 KHz but then has a response similar to that of the Y capacitor at higher frequencies. In this example the gain of the filter 260 may be within 10 dB of the single Y capacitor for frequencies above 250 KHz. This may be necessary to comply with EMI requirements of the switch mode power supply 250. The switch mode power supply 250 including the noise filter 260 may preferentially reduce the common mode noise in the peak conductance frequency region 286.

By boosting the conductance value in a limited frequency range or region 286, the common-mode noise performance in that range may allow a mobile device including a touch screen to be operated correctly while connected to a charger including the switch mode power supply 250. In some examples, the increase in conductance value may correspond to a gain increase of 20 to 40 dB compared to the average gain of the filter over a wider frequency spectrum which may be for example up to 30 MHz. This increased conductance may allow for a more efficient power conversion method to be used. The two capacitors connected in parallel but may for example have half the capacitance value of a single Y capacitor. Consequently the total value of capacitance in the noise filter 260 may be the same as for a single Y-capacitor, while preferentially improving the noise performance at touch controller frequencies.

Figure 5A:
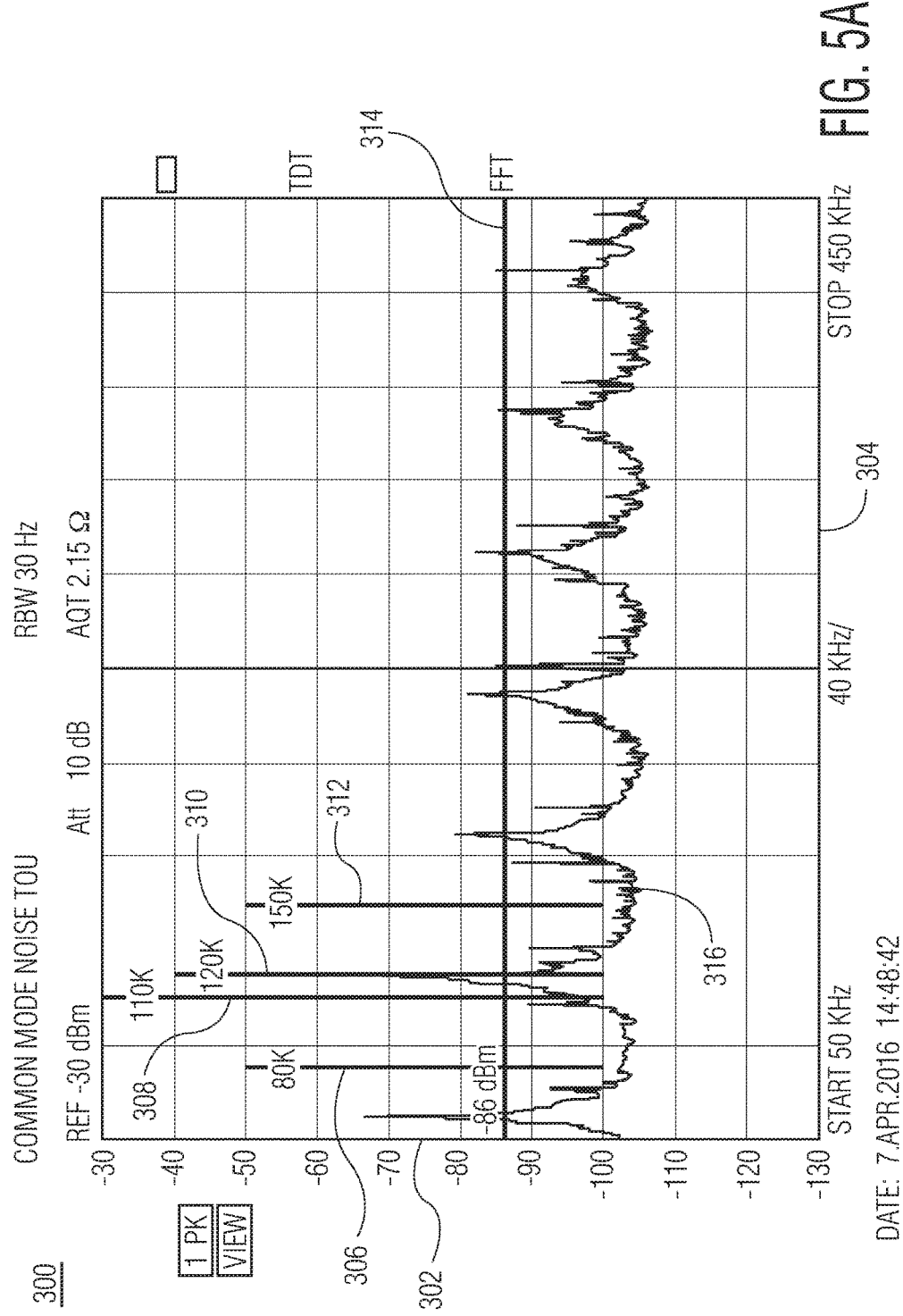
FIG. 5a illustrates the common mode noise performance of the switch mode power supply of FIG. 1.
Figure 5B:
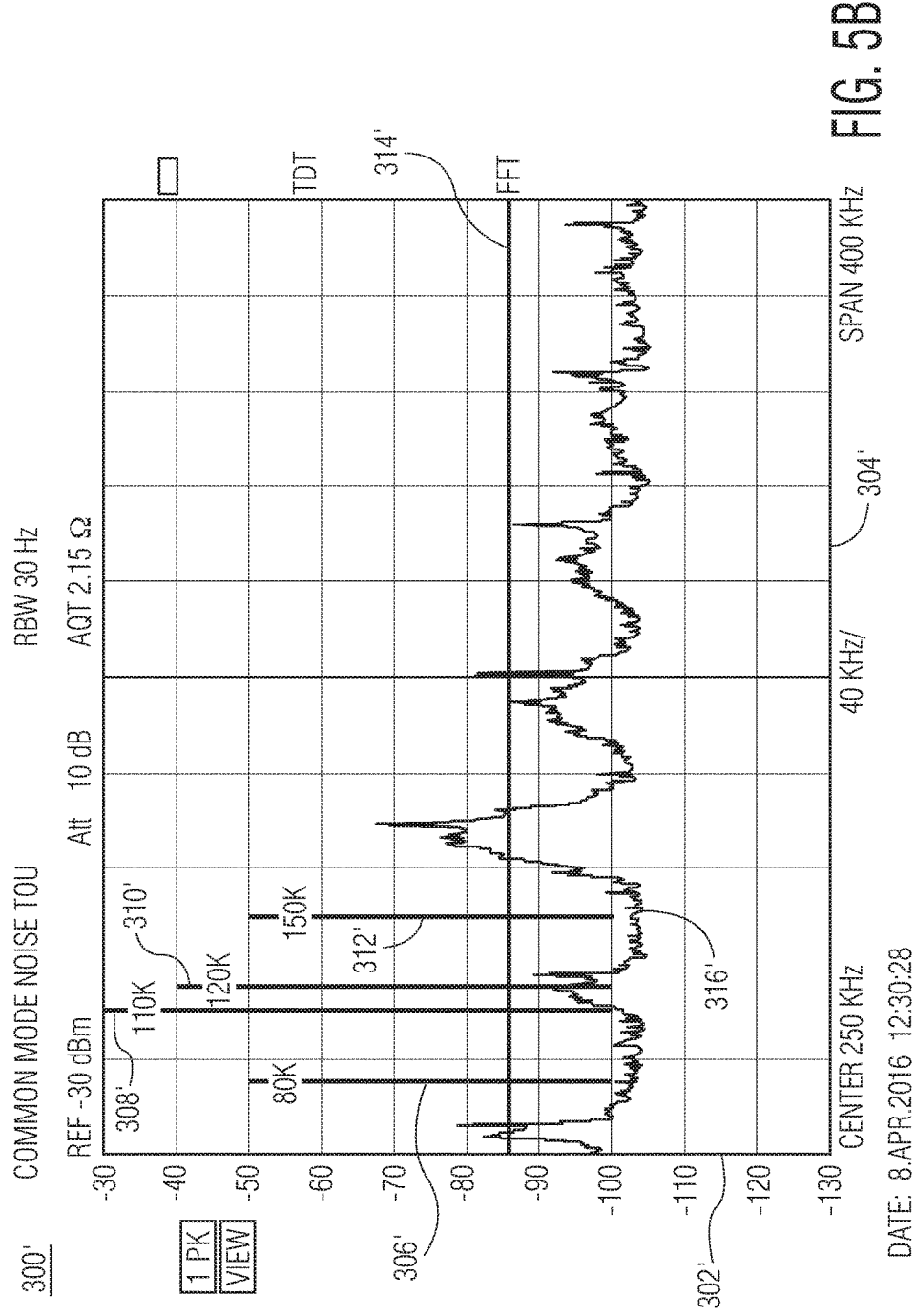
FIG. 5b shows the common mode noise performance of the switch mode power supply of FIG. 3.

FIG. 5A shows the noise measurement results 300 for switch mode power supply 100 and FIG. 5B shows noise measurement results 300' for switch mode power supply 250. Reference numerals including an apostrophe refer to corresponding features in the results 300' of the switch mode power supply 250 to that of the results 300 of the switch mode power supply 100. Noise measurement results 300, 300' have an x-axis 304, 304' varying in frequency between 50 kHz and 450 kHz. The y-axes 302,302' vary from −130 dBm to −30 dBm. Vertical lines 306, 306' indicate the 80 KHz frequency. Vertical lines 308,308' indicate the 110 KHz frequency. Vertical lines 310,310' indicate the 120 KHz frequency. Vertical lines 312,312' indicate the 150 KHz frequency. Horizontal lines 314,314' indicates a noise level of −86 dBm. The lines 316,316' show the respective common mode noise levels at varying frequencies for the switch mode power supply 100 and the switch mode power supply 250. The switch mode power supply 250 including the noise filter 260 has a noise level of less than −86 dBm in a selected 30 KHz band having a centre frequency between 80 KHz and 150 KHz which may include touch screen controller operating frequencies. The switch mode power supply 100 has a peak at 120 KHz on one of the frequency bands with a noise level of −70 dBm. The switch mode power supply 250 including the noise filter 260 may reduce the interference to mobile devices with touch screens being operated while charging while complying with overall EMI requirements.

Figure 6:
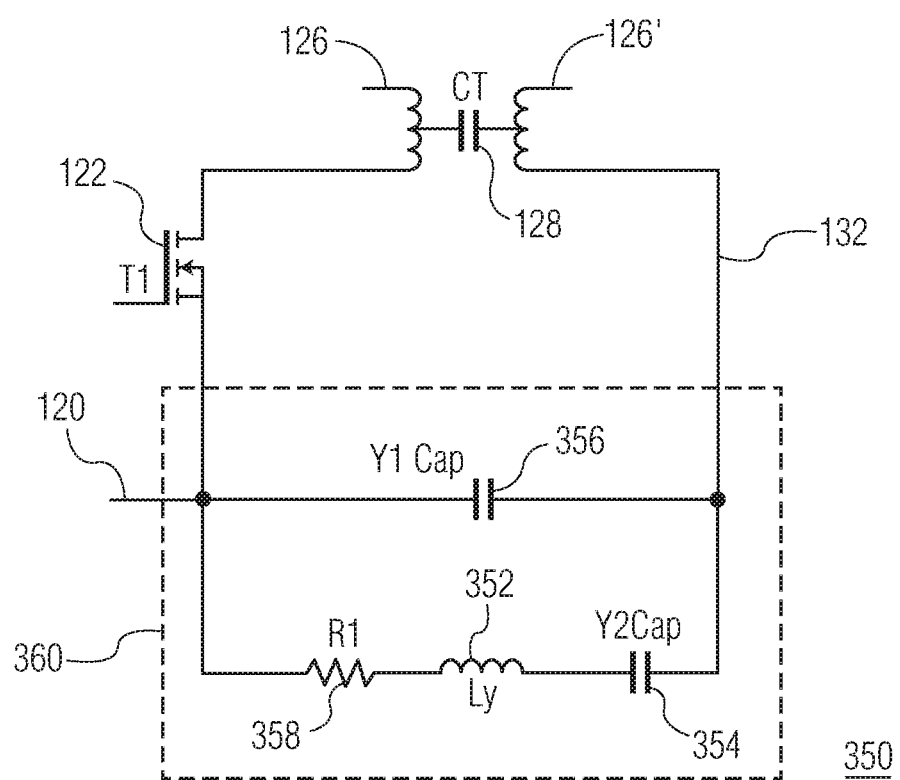
FIG. 6 shows a switch mode power supply including a noise filter according to an embodiment.

FIG. 6 shows a switch mode power supply 350 including an isolating transformer with a primary coil 126 and secondary coil 126'. A switch transistor 122 may be connected between the primary coil 126, and the primary ground 120. A noise filter 360 may be connected between the primary ground 120 and the secondary ground 132. The noise filter 360 includes a first capacitor 356 which may be a Y-type capacitor connected between the primary ground 120 and the secondary ground 132. The noise filter 360 includes a series arrangement of a resistor 358, an inductor 352 and a second capacitor 354 which may be a Y-type capacitor connected between the primary ground 120 and the secondary ground 132. As will be appreciated, the series arrangement of the resistor 358, the inductor 252 and the second capacitor 254 is connected in parallel with the first capacitor 256. Other components of the switch mode power supply 350 are not shown. The first capacitor 356 may have a capacitance value in the range of 50 pF to 220 pF. The second capacitor 354 may have a capacitance value in the range of 50 pF to 220 pF. In some examples, the first capacitor 356 and the second capacitor 354 may have an equal capacitance. The inductor 352 may have an inductance in the range of 1 mH to 30 mH. The resistor 358 may have a resistance in the range of 50 Ohms to 5 K Ohm.

Figure 7A:
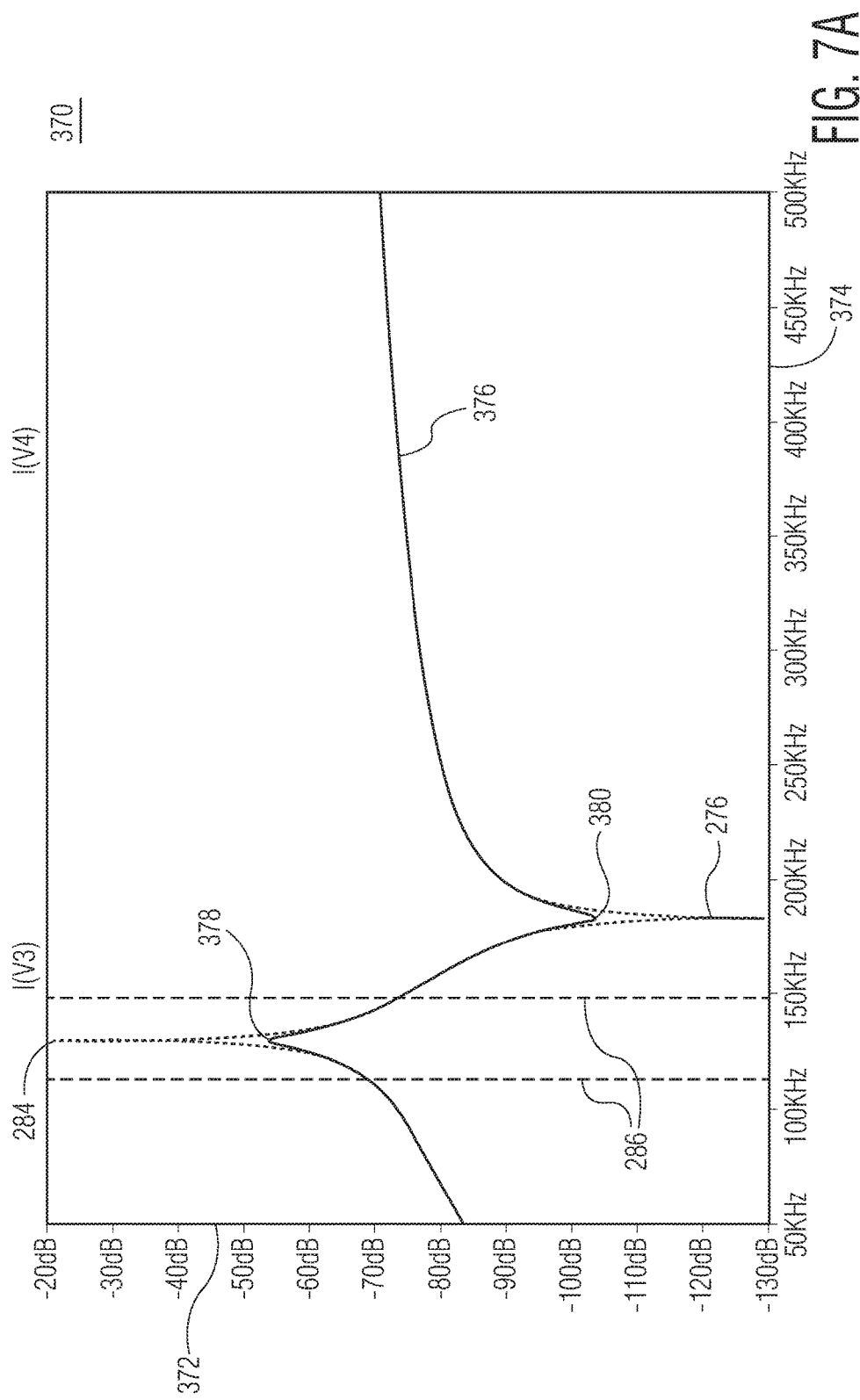
FIG. 7a shows the simulation results of the noise filter included in the switch mode power supply of FIG. 6 and FIG. 3.
Figure 7B:
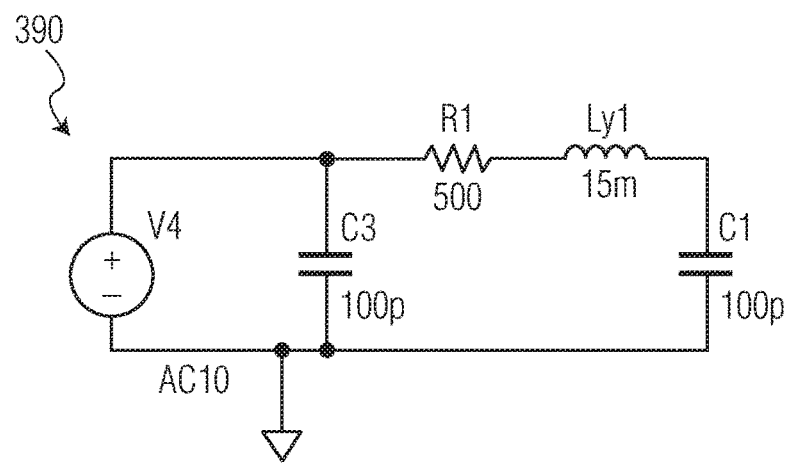
FIG. 7b shows the equivalent circuit used in the simulation of the noise filter of FIG. 6.

An example simulation result 370 of the noise filter 360 compared with noise filter 260 is shown in FIG. 7A. X-axis 374 shows a frequency varying from 50 kHz to 500 kHz. The y-axis 372 shows the filter gain varying from −130 dB up to −20 dB. Increasing values of gain accordingly corresponds to increasing conductance of the filter 260. Line 276 shows the response of noise filter 260 which is the same as shown in simulation result 270. Line 376 shows the gain of the noise filter 360 simulated using the equivalent circuit 390 shown in FIG. 7B. In this example the inductor 352 may have a value of 15 mH, the resistance 358 may have a value of 500 ohms, the first capacitor 256 may have a value of 100 pF, and the second capacitor 354 may have a value of 100 pF. Line 376 shows a peak 378 of approximately −55 dB at a frequency of 130 KHz which is a smaller peak gain value then the peak value 284 for the noise filter 260. Outside the peak region 286, the gain of the filter 360 in this example may have a negative notch 380 at around 210 KHz having a higher minimum gain value compared to the noise filter 260 at a similar frequency. At higher frequencies, for these example component values, the response of the noise filter 360 and noise filter 260 may be similar.

As may be seen from the example simulation 370, the peak value of conductance of noise filter 360 may be lower compared to the noise filter 260. Noise filter 360 may have a higher minimum value of conductance outside the peak region 286 over the EMI frequency bandwidth. This may result in improved overall EMI performance of the switch mode power supply 350 compared to switch mode power supply 250. The switch mode power supply 350 may preferentially reduce the common mode noise in the frequency region 286 including the peak gain 378.

Figure 8:
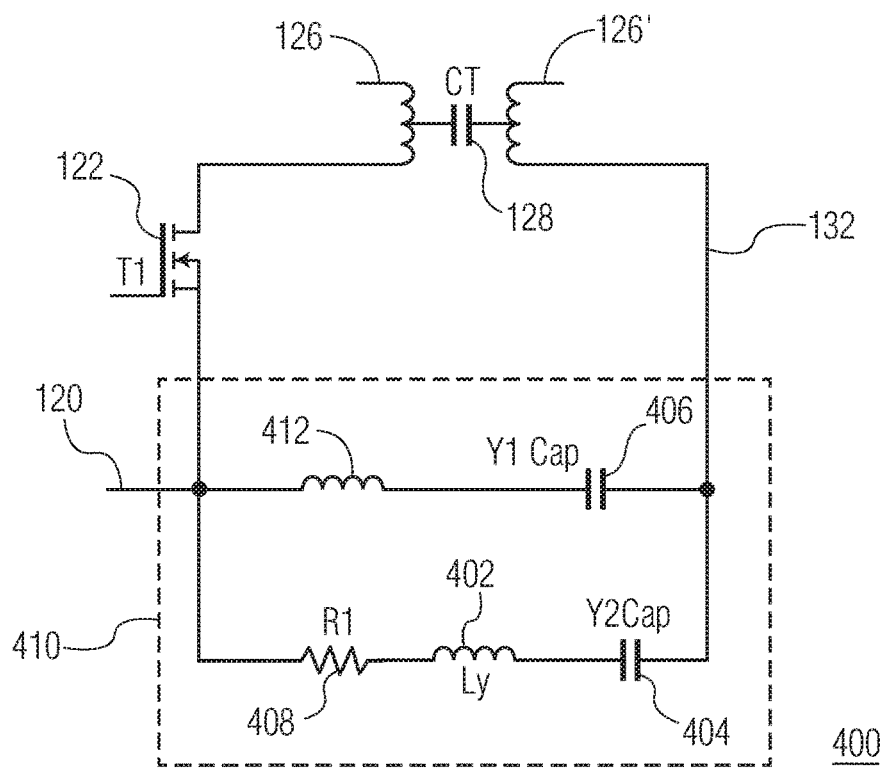
FIG. 8 shows a switch mode power supply including a noise filter according to an embodiment.

FIG. 8 shows a switch mode power supply 400 including an isolating transformer with a primary coil 126 and secondary coil 126'. A switch transistor 122 may be connected between the primary coil 126, and the primary ground 120. A noise filter 410 may be connected between a primary ground 120 and the secondary ground 132. The noise filter 410 includes a series arrangement of a first inductor 412 and a first capacitor 406 connected between the primary ground 120 and the secondary ground 132. The noise filter 410 includes a series arrangement of a resistor 408, a second inductor 402 and a second capacitor 404 connected between the primary ground 120 and the secondary ground 132. As will be appreciated, the series arrangement of the resistor 408 the second inductor 402 and a second capacitor 404 is connected in parallel with the series arrangement of the first inductor 412 and the first capacitor 406. Other components of the switch mode power supply 400 are not shown. The first capacitor 406 may have a capacitance value in the range of 50 pF to 220 pF. The second capacitor 404 may have a capacitance value in the range of 50 pF to 220 pF. In some examples, the first capacitor 406 and the second capacitor 404 may have an equal capacitance. The first inductor 412 may have an inductance in the range of 1 microHenry (µH) to 30 mH. The second inductor 402 may have an inductance in the range of 1 µH to 30 milliHenries. In some examples the first inductor 412 and the second inductor 402 may have an equal inductance value. The resistor 408 may have a resistance in the range of 50 Ohms to 5 KOhm.

Figure 9B:
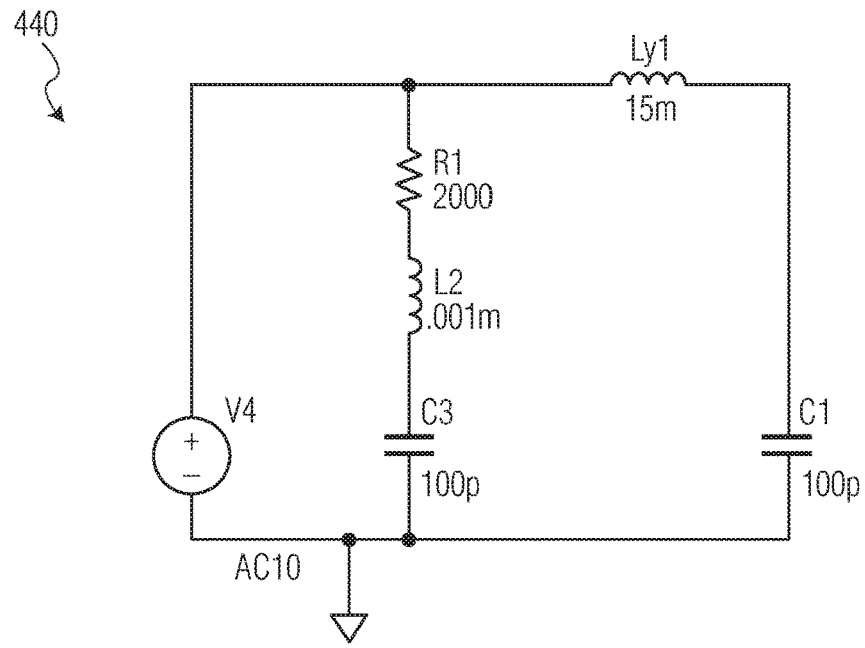
FIG. 9b shows the equivalent circuit used in the simulation of the noise filter of FIG. 8.

FIG. 9A shows an example simulation graph 420 of the noise filter 410 and noise filter 260. The graph 420 has an X-axis 424 with a frequency varying from 50 kHz to 500 KHz. The y-axis 422 shows the filter gain varying from −130 dB up to −20 dB. Increasing values of gain accordingly corresponds to increasing conductance of the noise filters 260, 410. Line 276 shows the response of noise filter 260 which is the same as shown in simulation result 270. Line 426 shows the response of the noise filter 410 simulated using the equivalent circuit 440 shown in FIG. 9B. In this example, the first inductor 412 has a value of 15 milliHenries, the first capacitor 406 has a value of 100 pF, the resistor 408 may have a value of 2 KOhm, the first capacitor 406 has a value of 100 pF, and the second inductor 402 has a value of 1 microhenry. Line 426 shows a peak 428 of approximately −20 dB at a frequency of 130 KHz which is a comparable peak gain to the peak value 284 for the noise filter 260. Outside the peak region 286, the gain of the filter 410 in this example may have a negative notch or dip 430 at around 210 KHz having a higher minimum gain value compared to the noise filter 260. Between 250 KHz and 500 KHz, the response of the noise filter 410 and the noise filter 260 may be similar. At higher frequencies between 1 MHz and 10 MHz (not shown) the gain of the filter 410 may be relatively constant and have a lower gain value than noise filter 260. The noise filter 410 may have an equivalent peak gain to the noise filter 260 in the peak conductance frequency region.

As may be seen from the example simulation 420, the peak value of conductance of noise filter 410 may be comparable to the noise filter 260. The noise filter 410 may also have a higher minimum value of conductance outside the peak region 286 than noise filter 260. This may result in improved overall EMI performance of the switch mode power supply 400 compared to switch mode power supply 250. The switch mode power supply 400 including the noise filter 410 may preferentially reduce the common mode noise in the peak conductance frequency region 286 including the peak 428.

Figure 10:
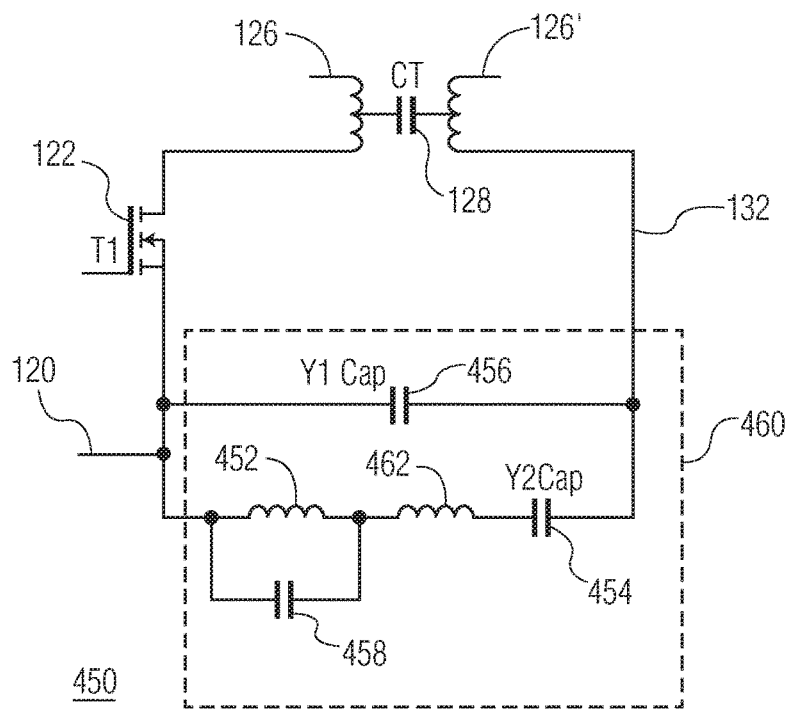
FIG. 10 shows a switch mode power supply including a noise filter according to an embodiment.

FIG. 10 shows a switch mode power supply 450 including an isolating transformer with a primary coil 126 and secondary coil 126'. A switch transistor 122 may be connected between the primary coil 126, and the primary ground 120. A noise filter 460 may be connected between a primary ground 120 and the secondary ground 132. The noise filter 460 includes a first capacitor 456 which may be a Y-type capacitor connected between the primary ground 120 and the secondary ground 132. The noise filter 460 includes a series arrangement of a first inductor 452, a second inductor 462 and a second capacitor 454 which may be a Y-type capacitor connected between the primary ground 120 and the secondary ground 132. As will be appreciated, the series arrangement of the first inductor 452, the second inductor 462 and the second capacitor 454 is connected in parallel with the first capacitor 406. Noise filter 460 includes a third capacitor 458 connected in parallel with the first inductance 452. Other components of the switch mode power supply 450 are not shown. The first capacitor 456 may have a capacitance value in the range of 50 pF to 220 pF. The second capacitor 454 may have a capacitance value in the range of 50 pF to 220 pF. The third capacitor 458 may have a capacitance value in the range of 50 pF to 220 pF. The first inductor 452 may have an inductance in the range of 1 µH to 30 mH. The second inductor 462 may have an inductance in the range of 1 µH to 30 mH. In some examples the first inductor 402 and the second inductor 412 may have an equal inductance value.

Figure 11A:
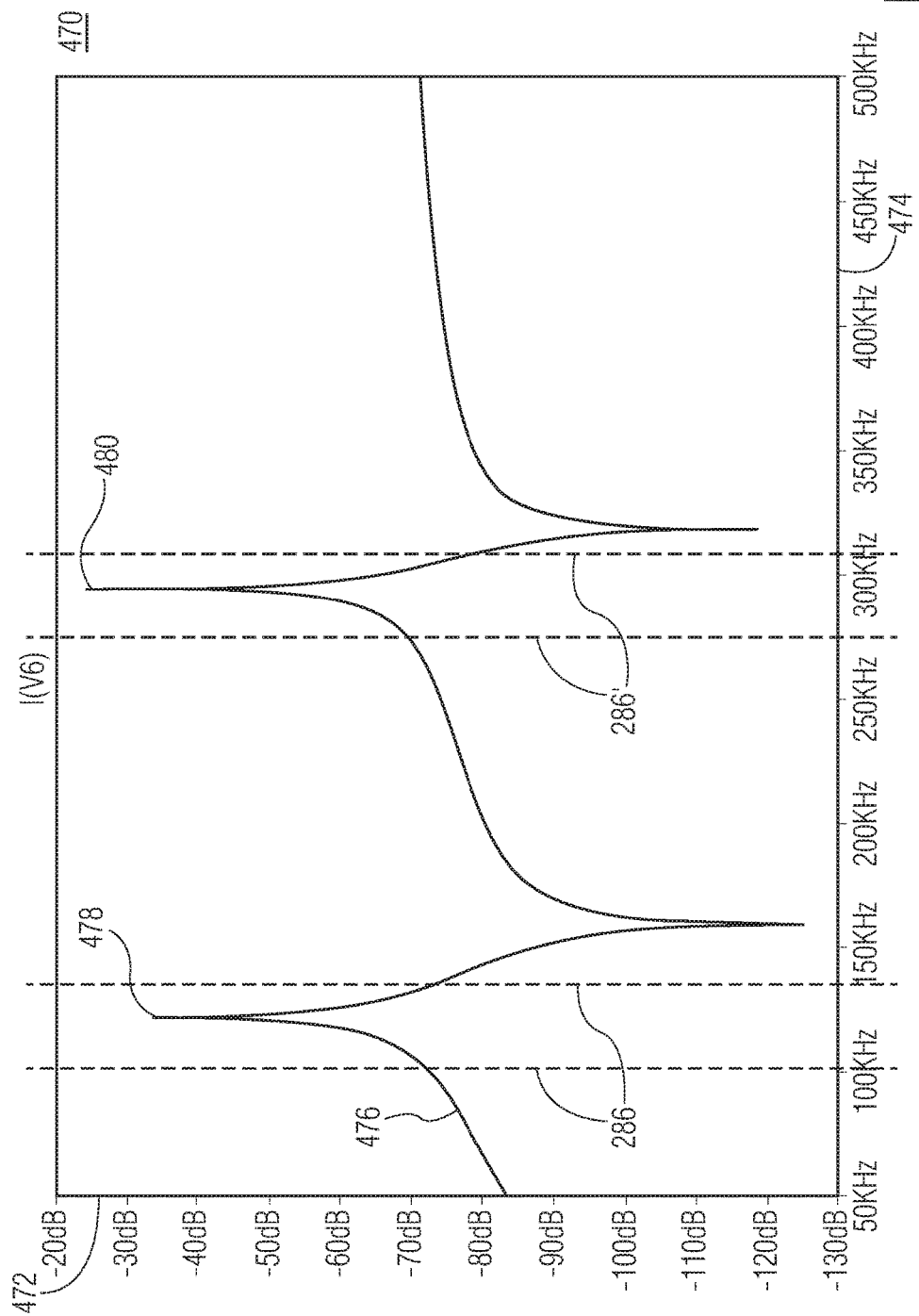
FIG. 11a shows the simulation results of the noise filter included in the switch mode power supply of FIG. 10.
Figure 11B:
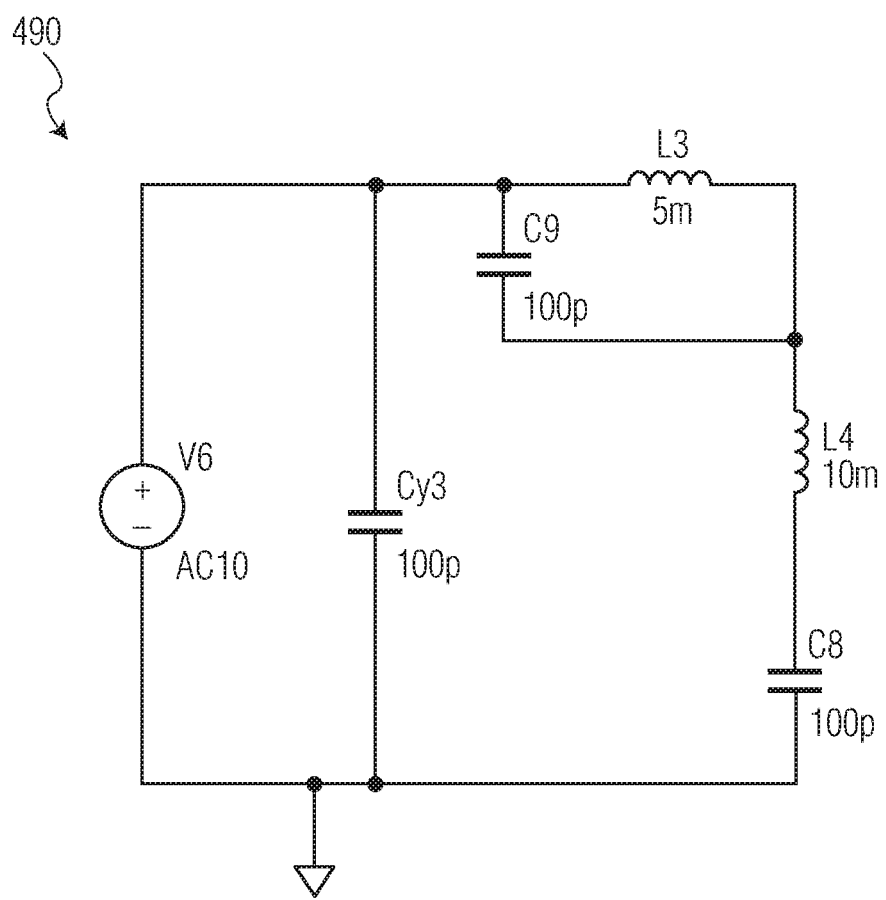
FIG. 11b shows the equivalent circuit used in the simulation of the noise filter of FIG. 10.

The noise filter 460 may have two peak conductance frequency regions. This is shown in FIG. 11A which shows a simulation of the frequency response 470 of the noise filter 460. The graph 470 has an X-axis 474 with a frequency varying from 50 kHz to 500 KHz. The y-axis 422 shows the filter gain varying from −130 dB up to −20 dB. Increasing values of gain accordingly corresponds to increasing conductance of the noise filter 460. Line 476 shows the response of the noise filter 460 simulated using the equivalent circuit 490 shown in FIG. 11B. In this simulation, the first capacitor 456 has a value of 100 pF, the first inductor 452 has a value of 5 mH, the second inductor 462 has a value of 10 mH, the second capacitor 454 has a value of 100 pF, and the third capacitor 454 has a value of 100 pF. Line 426 shows a peak 478 of approximately −35 dB at a frequency of 130 KHz within a first peak conductance region 286. Line 426 shows a further peak 480 of approximately −25 dB at a frequency of approximately 290 KHz within a further peak conductance region 286'. In this example, the first peak conductance frequency region 286 and further peak conductance frequency region 286' may have a bandwidth of approximately 30 KHz. The switch mode power supply 450 including the noise filter 460 may preferentially improve the noise in two peak conductance regions. These peak conductance regions may include frequencies corresponding to touch screen controller operating frequencies.

Examples of the switch mode power supply including the noise filter described herein may be included in chargers for mobile devices with touch screens. The switch mode power supply may preferentially improve the common mode noise at touch screen controller operation frequencies. This may allow a mobile phone with a touch screen to operate reliably while connected to an example switch mode power supply during charging. A more efficient switch mode power supply method may be used, since any harmonics which may interfere with the touch screen operation may be reduced by the noise filter.

In other examples the noise filter described may be applied to any switch-mode power supply using switches at one side of an isolating transformer while the output, which should not carry noise, is at the other side.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A switch mode power supply comprising:
 a primary side configured to be coupled to a mains supply and
 a secondary side configured to be coupled to a device,
 an isolation transformer comprising a primary coil and a secondary coil and configured to isolate the primary side from the secondary side, and
 a positive notch filter coupled between a primary ground at the primary side and a secondary ground at the secondary side, having a conductance value that increases within a peak conductance frequency region, a peak conductance value in the peak conductance frequency region, and configured to reduce common-mode noise of the switch mode power supply at frequencies occurring in the peak conductance frequency region.

2. The switch mode power supply of claim 1, wherein the positive notch filter further comprises:
 a first capacitor; and
 a first inductor.

3. The switch mode power supply of claim 2, wherein the positive notch filter further comprises:
 a second capacitor in parallel with a series arrangement of the first inductor and the first capacitor.

4. The switch mode power supply of claim 2, wherein the positive notch filter further comprises:
 a resistance arranged in series with the first inductor and the first capacitor.

5. The switch mode power supply of claim 3, wherein the positive notch filter further comprises:
 a second inductor arranged in series with the second capacitor.

6. The switch mode power supply of claim 3, wherein the positive notch filter further comprises:
 a second inductor arranged in series with the first capacitor and in parallel with a third capacitor.

7. The switch mode power supply of claim 3, wherein each of the first capacitor and the second capacitor comprise Y-capacitors.

8. The switch mode power supply of claim 5, wherein the first capacitor and the second capacitor have a value in a capacitance range of 50 pF to 220 pF, and the first inductor and the second inductor have a value in an inductance range of 1 mH to 30 mH.

9. The switch mode power supply of claim 1, wherein the positive notch filter further comprises:
 a first terminal connected directly to the primary ground; and
 a second terminal connected directly to the secondary ground.

10. The switch mode power supply of claim 1, wherein the peak conductance frequency region has a center frequency in a frequency range of 80 to 150 KHz and a bandwidth of 30 KHz.

11. The switch mode power supply of claim 1, wherein the peak conductance frequency region comprises a frequency equal to a frequency of operation of a touch screen controller in a mobile device.

12. The switch mode power supply of claim 1, wherein the positive notch filter is configured to reduce common-mode noise due to the switch mode power supply over a frequency range of 60 KHz to 30 MHz and the peak conductance frequency region comprises a subset of the frequency range.

13. The switch mode power supply of claim 1, wherein the peak conductance occurs at a frequency of less than 150 KHz.

14. The switch mode power supply of claim 1, wherein the positive notch filter conductance comprises a second peak conductance in a second peak conductance frequency region, the positive notch filter is configured to reduce the common-mode noise of the switch mode power supply at frequencies occurring in the peak conductance frequency region and the second peak conductance frequency region.

15. A charger for a mobile device comprising the switch mode power supply of claim 1.

* * * * *